(12) United States Patent
Chang

(10) Patent No.: US 10,732,077 B2
(45) Date of Patent: Aug. 4, 2020

(54) TIRE ROLLING RESISTANCE TEST MACHINE

(71) Applicant: EKTRON TEK CO., LTD., Changhua County (TW)

(72) Inventor: Yau Dong Chang, Changhua County (TW)

(73) Assignee: EKTRON TEK CO., LTD., Tianzhong Township (TW)

(*) Notice: Subject to any disclaimer, the term of this patent is extended or adjusted under 35 U.S.C. 154(b) by 78 days.

(21) Appl. No.: 16/184,884

(22) Filed: Nov. 8, 2018

(65) Prior Publication Data
US 2019/0178753 A1 Jun. 13, 2019

(30) Foreign Application Priority Data
Nov. 8, 2017 (TW) .............................. 106138651 A

(51) Int. Cl.
*G01M 17/02* (2006.01)
(52) U.S. Cl.
CPC ................................ *G01M 17/022* (2013.01)
(58) Field of Classification Search
USPC ............................................... 73/146–146.8
See application file for complete search history.

(56) References Cited

U.S. PATENT DOCUMENTS

| | | | | |
|---|---|---|---|---|
| 4,458,527 A | * | 7/1984 | McFarland | G01M 17/022 73/146 |
| 4,489,598 A | * | 12/1984 | Beebe | G01M 17/022 73/146 |
| 2009/0006007 A1 | * | 1/2009 | Greiner | G01M 17/02 702/44 |
| 2009/0314407 A1 | * | 12/2009 | Browne | B29D 30/0061 152/527 |
| 2014/0000363 A1 | * | 1/2014 | Clasquin | G01M 17/02 73/462 |
| 2014/0311231 A1 | * | 10/2014 | Braghiroli | G01M 1/04 73/146 |
| 2019/0204185 A1 | * | 7/2019 | Bosl | G01M 17/022 |

FOREIGN PATENT DOCUMENTS

| | | | | |
|---|---|---|---|---|
| WO | WO-2013041802 A1 | * | 3/2013 | ............. G01L 17/00 |
| WO | WO-2017207180 A1 | * | 12/2017 | .......... G01M 17/022 |
| WO | WO-2018056081 A1 | * | 3/2018 | .......... G01M 17/022 |

* cited by examiner

*Primary Examiner* — Andre J Allen

(57) ABSTRACT

A tire rolling resistance testing machine has: a main testing set, an X-axis sensing member and a Y-axis sensing member. The X-axis sensing member and the Y-axis sensing member are configured for testing the tire, wherein the first connecting member and the second connecting member are floatingly mounted between the two X-axis positioning plates and the two Y-axis positioning plates which allow the axial rod to be placed through and perform the test. This design greatly improves the sensitivity of the first connecting member and the second connecting member, and avoids the mutual interference between the X-axis moment and the Y-axis moment when the tire is tested. Therefore, the precision of the test and the accuracy of rolling resistance data is improved.

4 Claims, 10 Drawing Sheets

TIRE ROLLING RESISTANCE TEST MACHINE

BACKGROUND of INVENTION

1. Field of Invention

The present invention relates to a testing machine, and more particularly to a tire rolling resistance testing machine.

2. Description of the Related Art

After the production of tire is finished, tires need to be tested to verify whether they meet the requirements. Tramping and runout of the tire are two important technical indicators for tire testing. The tramping of the tire is usually caused by insufficient radial circumference of the tire, such as the geometrical errors of the diameter or circumference of the tire. These errors will cause the vehicle to jump up and down, oscillate or bumpy during driving, which makes the passenger feel uncomfortable. The runout of the tire is the geometric error of the two sides of the tire. If the runout is too large, the vehicle body rocks left and right, which also reduces the passenger's riding comfort.

In prior art, the runout and tramping testing machine for the tire usually performs horizontal test, by mounting the test tire on a vertical shaft on the test machine, so that the tire is lying flat horizontally. During the testing, the tire is rotated and touching the sensor attached to the test machine, or a dial gauge is used to detect the rolling resistance of the tire.

However, this horizontal testing method for the tire is performed when the tire is idling during the test rotation, so the test results meet the requirements for the unloaded tire. When the tire is loaded, the carcass and the tread will be deformed, so the runout and tramp requirements may not be satisfied, resulting in a defective product.

Therefore, it is desirable to provide a tire rolling resistance testing machine to mitigate and/or obviate the aforementioned problems.

SUMMARY OF THE INVENTION

An objective of present invention is to provide a tire rolling resistance testing machine, which is capable of improving the above-mention problems.

In order to achieve the above mentioned objective, a tire rolling resistance testing machine: a main testing set, an X-axis sensing member and a Y-axis sensing member. The main testing set has loading wheel and a testing base. The testing base comprises two tracks and a gliding member, and the gliding member has a first frame parallel to the loading wheel and two parallel second frames fixed at two ends of the first frame. The first frame has a through aperture and a hydraulic cylinder connected to the second frame. The X-axis sensing member has a first connecting member and the two assembling plates. The first connecting member has a first axial sleeve, and the two assembling plates disposed parallel and evenly from the first axial sleeve. An X-axis positioning plate is disposed on each side of the first connecting member, and each of the two X-axis positioning plate has a first sleeved aperture jacketed onto respective ends of the first connecting member. The edges of the first connecting member are aligned with outside edges of the two X-axis positioning plates. The two X-axis positioning plates have a plurality of rollers around the first sleeved aperture, and the rollers make contact with the first connecting member. The two X-axis positioning plates are disposed on the two second frame of the gliding member, and one of the X-axis positioning plates has two joining plates attached to the second frames. Therefore, the first connecting member is floatingly limited between the two X-axis positioning plates. The second frame further has an X-axis sensing unit disposed between the two joining plates and configured for performing contact tests to the first connecting member. The Y-axis sensing member has a second connecting member and a second axial sleeve, and both ends of the second connecting member are provided with a conjoint section jacketed with a second sleeved aperture of a Y-axis positioning plate. The two Y-axis positioning plates have a plurality of rollers around the second sleeved aperture making contact with the conjoint section. The two Y-axis positioning plates are disposed between the two assembling plates of the X-axis sensing member, such that the second connecting member is floatingly limited between the two Y-axis positioning plates. Therefore, the second axial sleeve is connected to the axial sleeve of the first connecting member, and the second axial sleeve is aligned with the first axial sleeve of the first connecting member and configured for accepting an axial rod. The conjoint section of the second connecting member is provided with an assembling indention for accepting a reference member and limited by an assembling block, and edges of the reference member are higher than edges of the conjoint section. Moreover, the Y-axis positioning plate having a roof with a Y-axis sensing unit for making contact with the reference member.

Other objects, advantages, and novel features of invention will become more apparent from the following detailed description when taken in conjunction with the accompanying drawings.

DETAILED DESCRIPTION OF THE PREFERRED EMBODIMENT

Figure 1:
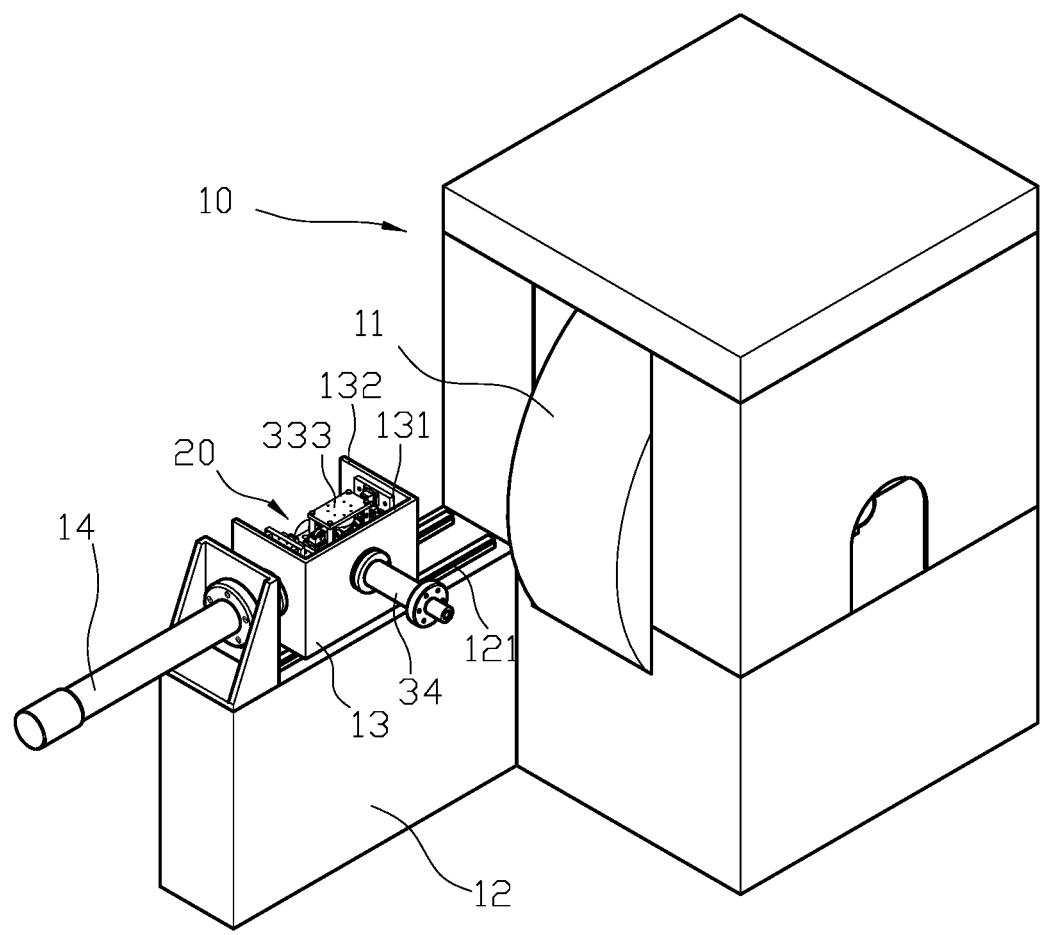
FIG. 1 is a perspective view of according to a preferred embodiment of the present invention.
Figure 2:
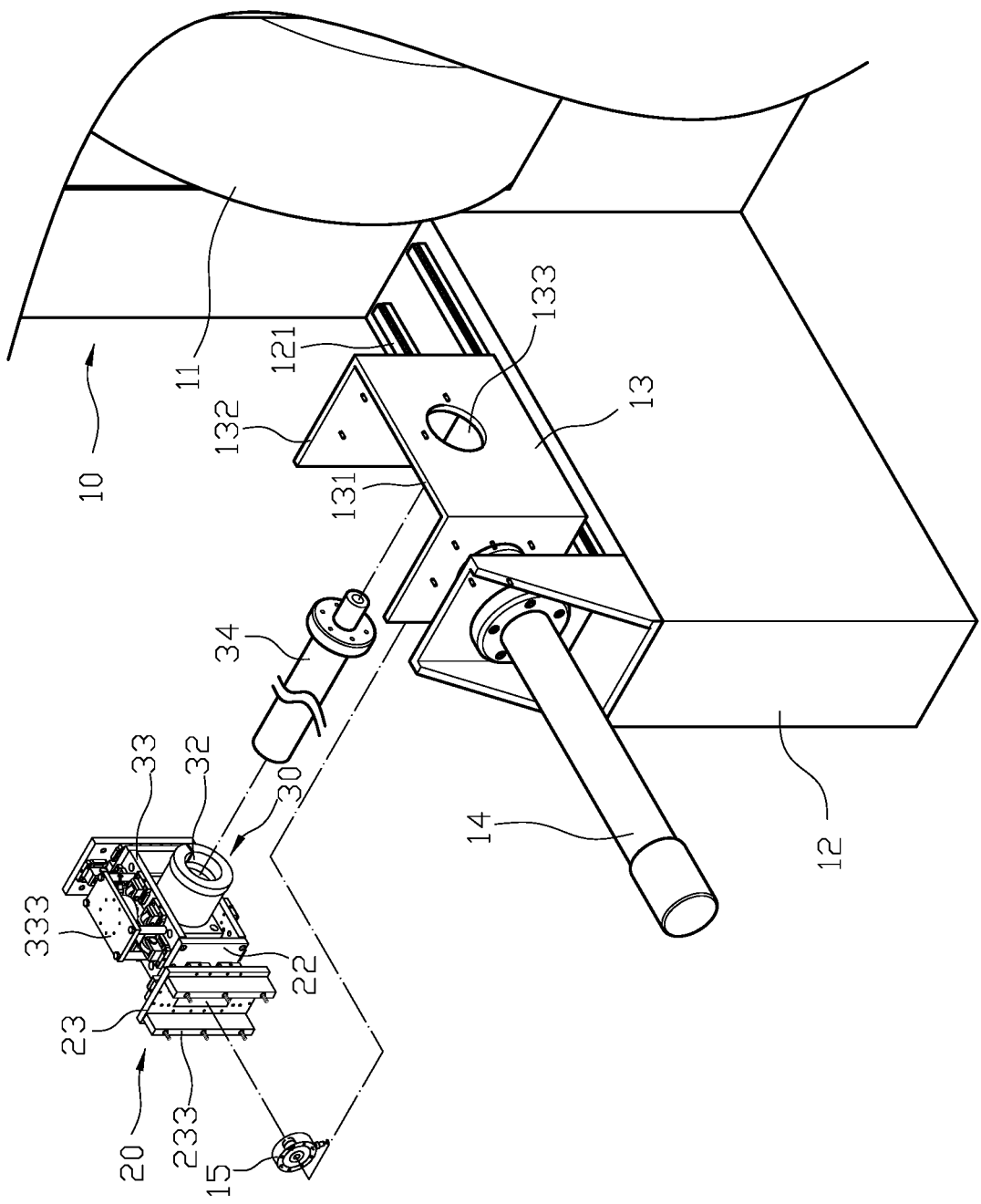
FIG. 2 is an exploded view according to the preferred embodiment of the present invention.
Figure 3:
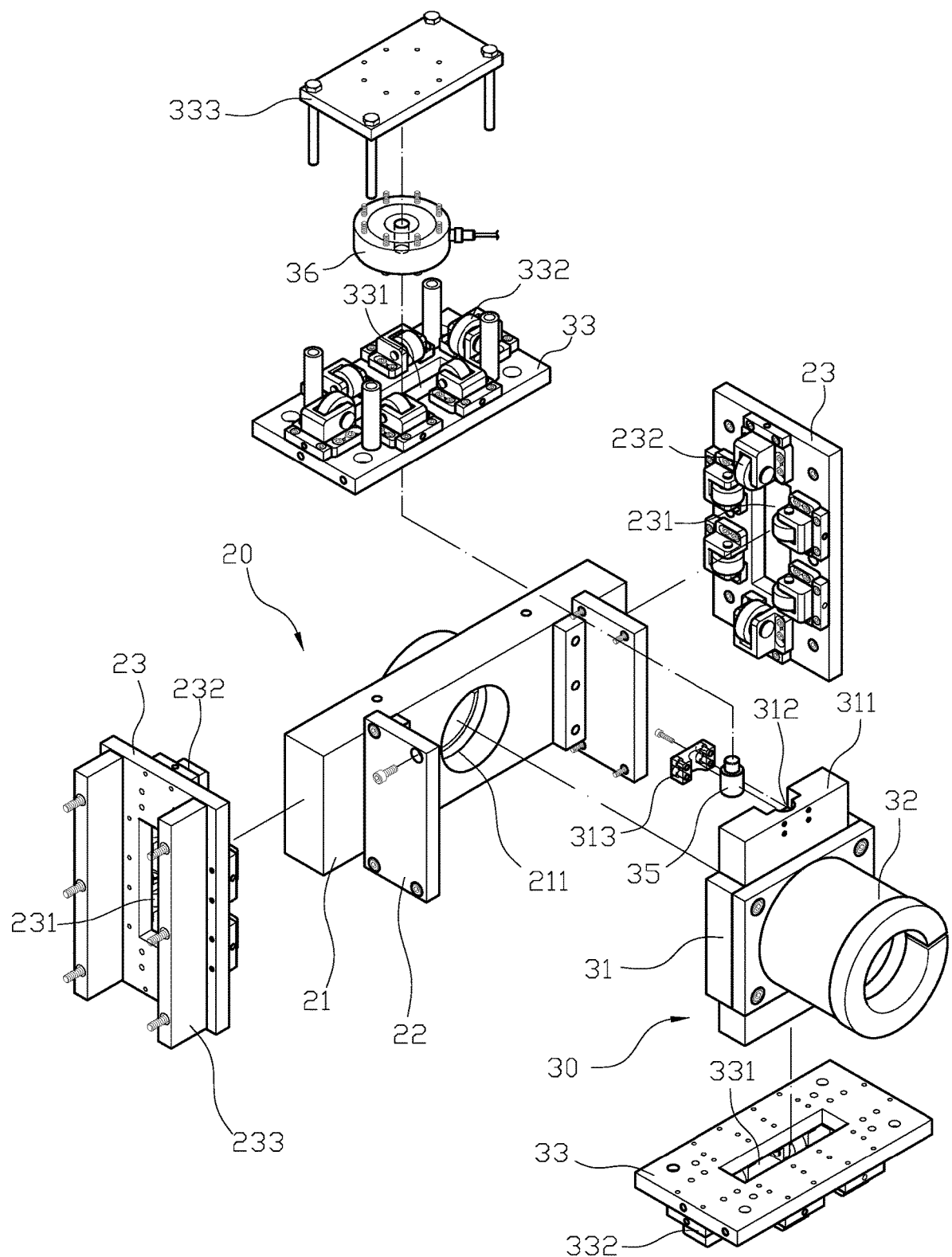
FIG. 3 is an exploded view of the X-axis sensing member and the Y-axis sensing member according to the preferred embodiment of the present invention.

Please refer to FIGS. 1, 2 and 3. A tire rolling resistance testing machine: a main testing set 10, an X-axis sensing member 20 and a Y-axis sensing member 30. The main testing set 10 has loading wheel 11 and a testing base 12. The testing base 12 comprises two tracks 121 and a gliding member 13, and the gliding member 13 has a first frame 131 parallel to the loading wheel 11 and two parallel second frames 132 fixed at two ends of the first frame 131. The first frame 131 has a through aperture 133 and a hydraulic cylinder 14 connected to the second frame 132. The X-axis sensing member 20 has a first connecting member 21 and the two assembling plates 22. The first connecting member 21 has a first axial sleeve 211, and the two assembling plates 22 disposed parallel and evenly from the first axial sleeve 211. An X-axis positioning plate 23 is disposed on each side of the first connecting member 21, and each of the two X-axis positioning plate 23 has a first sleeved aperture 231 jacketed onto respective ends of the first connecting member 21. The edges of the first connecting member 21 are aligned with outside edges of the two X-axis positioning plates 23. The two X-axis positioning plates 23 have a plurality of rollers 232 around the first sleeved aperture 231, and the rollers 232 make contact with the first connecting member 21. The two X-axis positioning plates 23 are disposed on the two second frame 132 of the gliding member 13, and one of the X-axis positioning plates 23 has two joining plates 233 attached to the second frames 132. Therefore, the first connecting member 21 is floatingly limited between the two X-axis positioning plates 23. The second frame 132 further has an X-axis sensing unit 15 disposed between the two joining plates 233 and configured for performing contact tests to the first connecting member 21. The Y-axis sensing member 30 has a second connecting member 31 and a second axial sleeve 32, and both ends of the second connecting member 31 are provided with a conjoint section 311 jacketed with a second sleeved aperture 331 of a Y-axis positioning plate 33. The two Y-axis positioning plates 33 have a plurality of rollers 332 around the second sleeved aperture 331 making contact with the conjoint section 311. The two Y-axis positioning plates 33 are disposed between the two assembling plates 22 of the X-axis sensing member 20, such that the second connecting member 31 is floatingly limited between the two Y-axis positioning plates 33. Therefore, the second axial sleeve 32 is connected to the axial sleeve 211 of the first connecting member 21, and the second axial sleeve 32 is aligned with the first axial sleeve 211 of the first connecting member 21 and configured for accepting an axial rod 34. The conjoint section 311 of the second connecting member 31 is provided with an assembling indention 312 for accepting a reference member 35 and limited by an assembling block 313, and edges of the reference member 35 are higher than edges of the conjoint section 311. Moreover, the Y-axis positioning plate having a roof 33 with a Y-axis sensing unit 36 for making contact with the reference member 35.

For actual assemble, please refer to FIGS. 1, 2 and 3 again. The first connecting member 21 of the X-axis sensing member 20 has an X-axis positioning plate 23 at both ends, and is contacted by the rollers 232 around the sleeved aperture 231 of the two X-axis positioning plate 23. Therefore, the first connecting member 21 has a floating state between the two X-axis positioning plates 23, and the conjoint section 311 at each ends of the second connecting member 31 of the Y-axis sensing member 30 is jacketed with a Y-axis positioning plate 33. Furthermore, the two Y-axis positioning plates 33 make contacts with the rollers 332 around the sleeved aperture, such that the second connecting member 31 has a floating state between the two Y-axis positioning plates 33. In addition, the conjoint section 311 has a perceiving member 35 above it, and the Y-axis positioning unit 36 is hung on the Y-axis positioning plate 33 corresponding to the reference member 35. The two Y-axis positioning plates 33 of the Y-axis sensing member 30 are disposed between the two assembling plates 22 of the X-axis sensing member 20, thereby the X-axis sensing member 20 and the Y-axis sensing member 30 are combine together. The Y-axis sensing member 30 and the X-axis sensing member 20 are both mounted on the gliding members 13, the second axial sleeve 32 passes through the through aperture 133 of the first frame 131, and the two X-axis positioning plates 23 of the X-axis sensing member 20 are mounted on the two second frames 132 of the gliding member 13. Each X-axis positioning plate 23 has a space constructed by the two joining plates 233 and the second frames 132, and the X-axis sensing unit 15 and the first connecting member 21 are disposed in the space, and the first axial sleeve 211 and the second axial sleeve 32 are connected together and accepting the axial rod 34 to perform the rotation of the loading wheel 11 for testing purposes.

Figure 4:
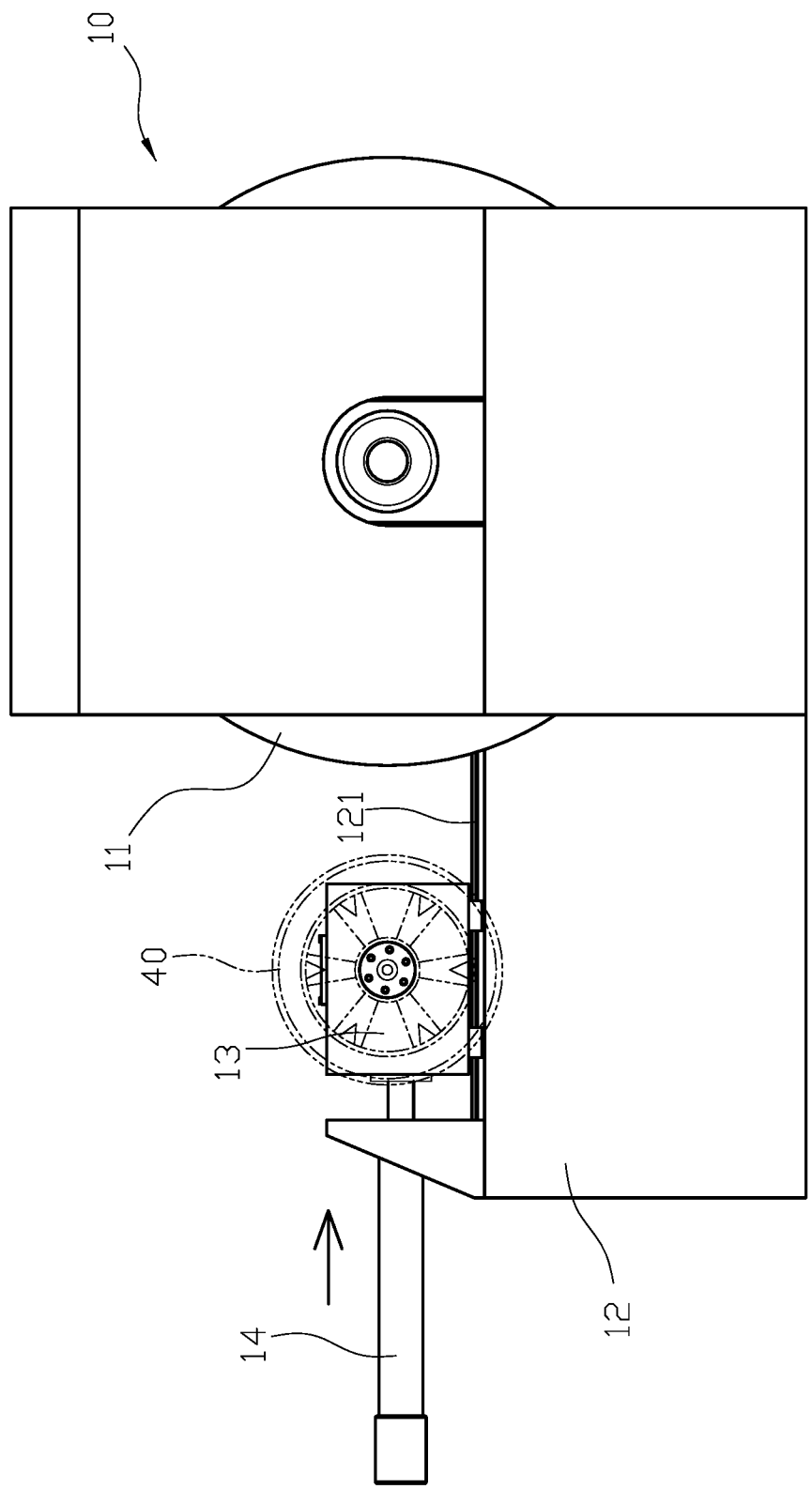
FIG. 4 is a schematic view showing a tire being tested according to the preferred embodiment of the present invention.
Figure 5:
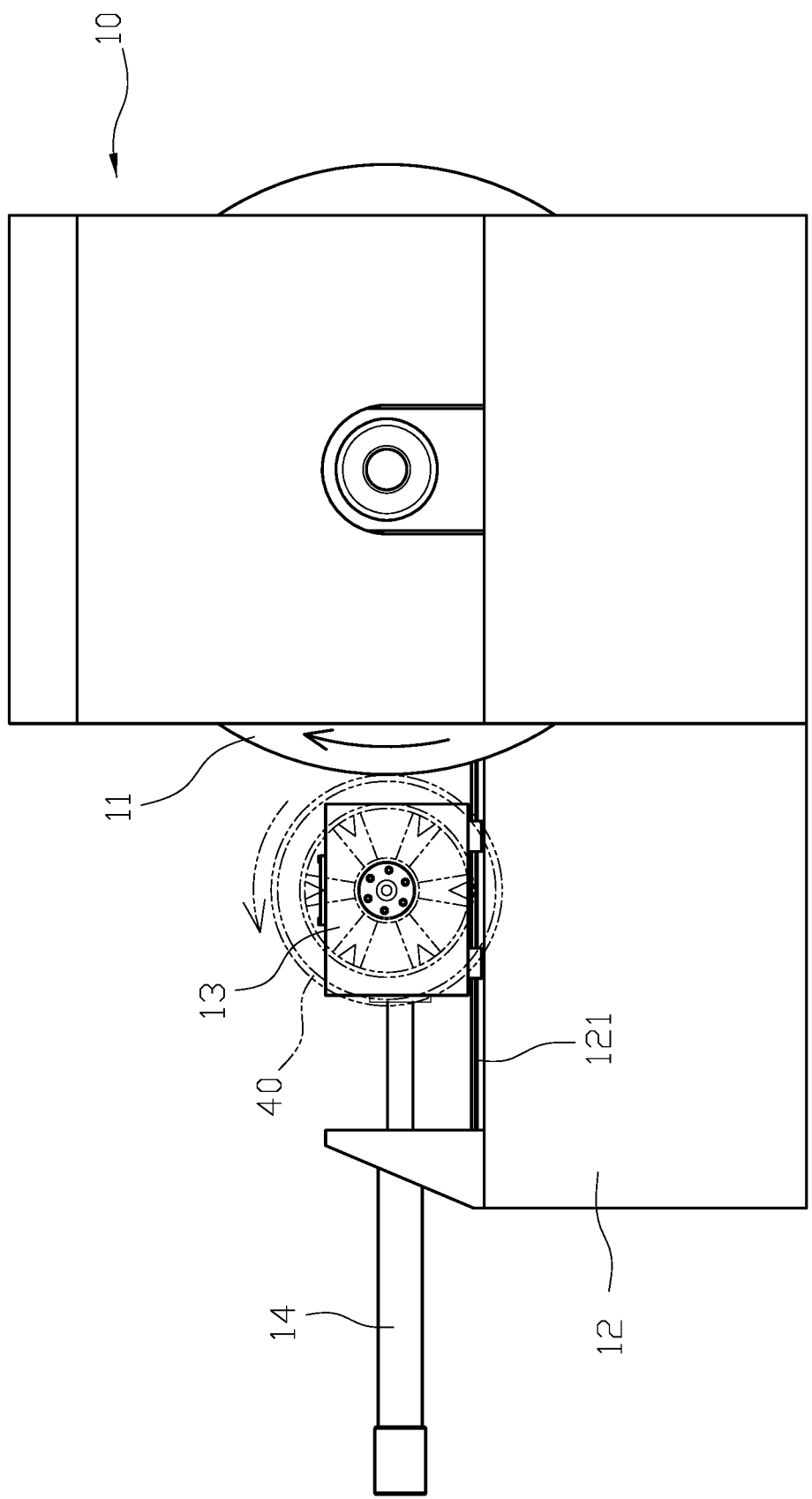
FIG. 5 is a schematic view showing the interfering rotations of the tire and the loading wheel according to the preferred embodiment of the present invention.
Figure 6:
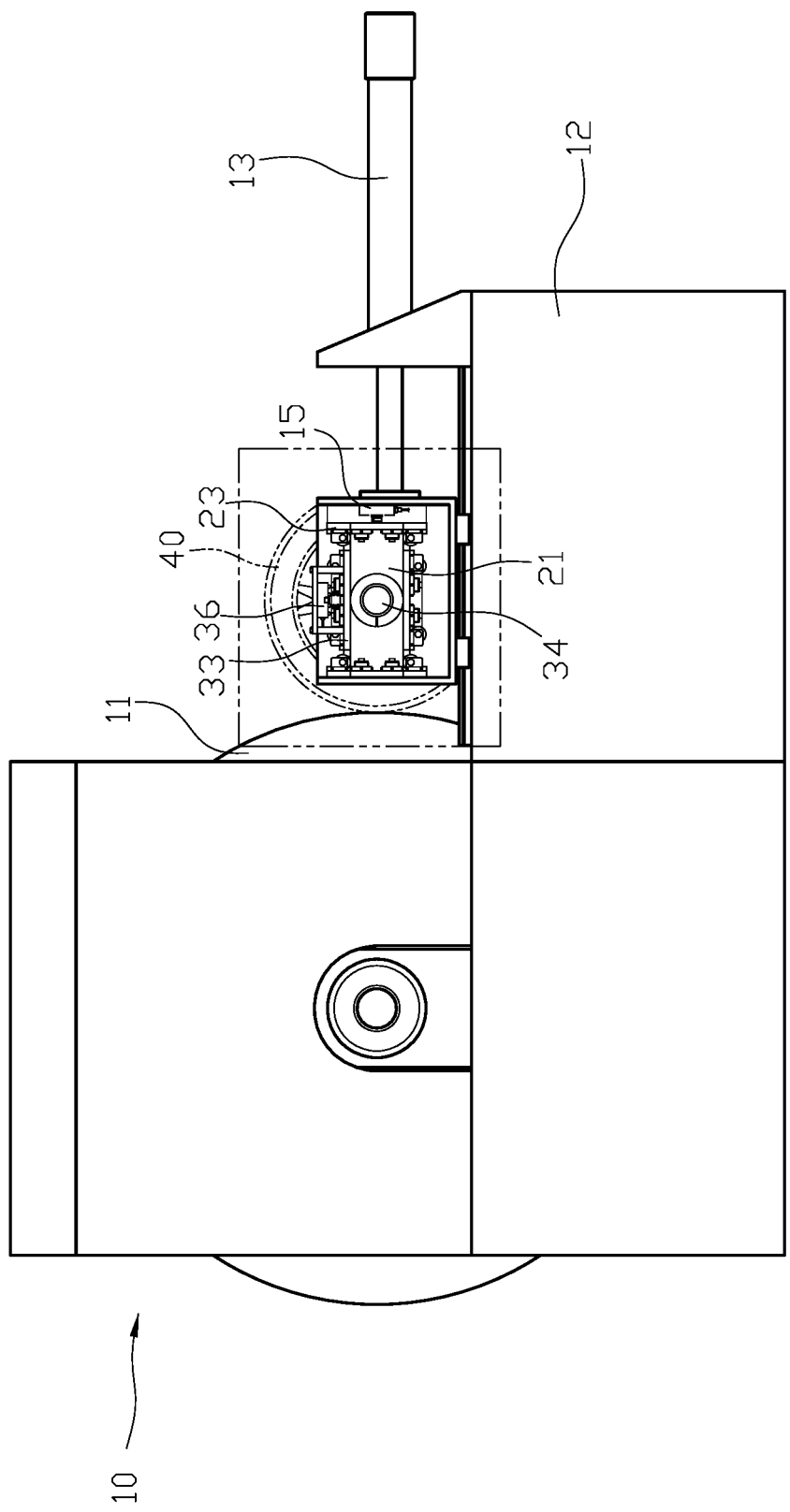
FIG. 6 is another perspective view of the interfering rotations of the tire and the loading wheel according to the preferred embodiment of the present invention.
Figure 7:
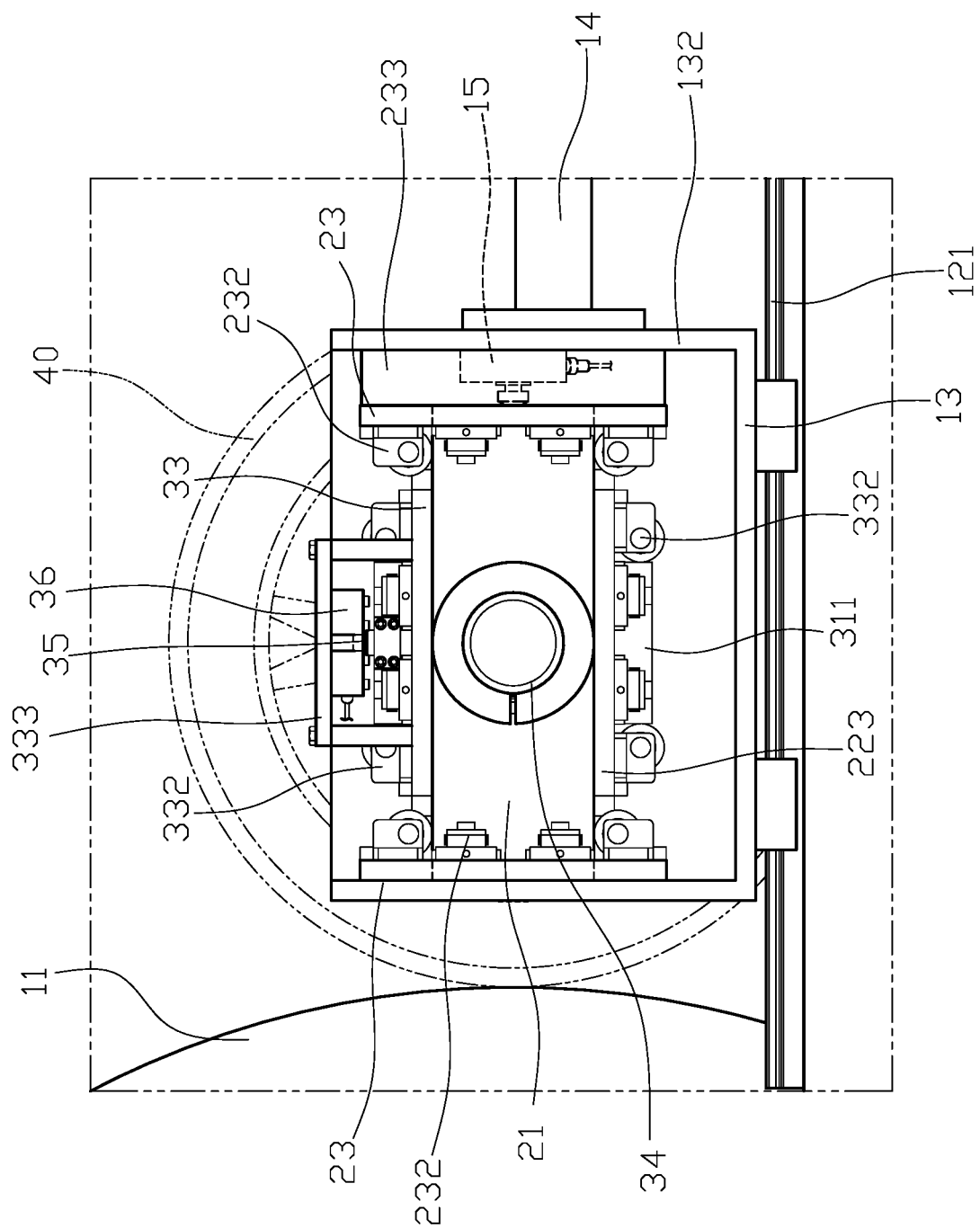
FIG. 7 is a partially enlarged schematic view of FIG. 6 according to the preferred embodiment of the present invention.
Figure 8:
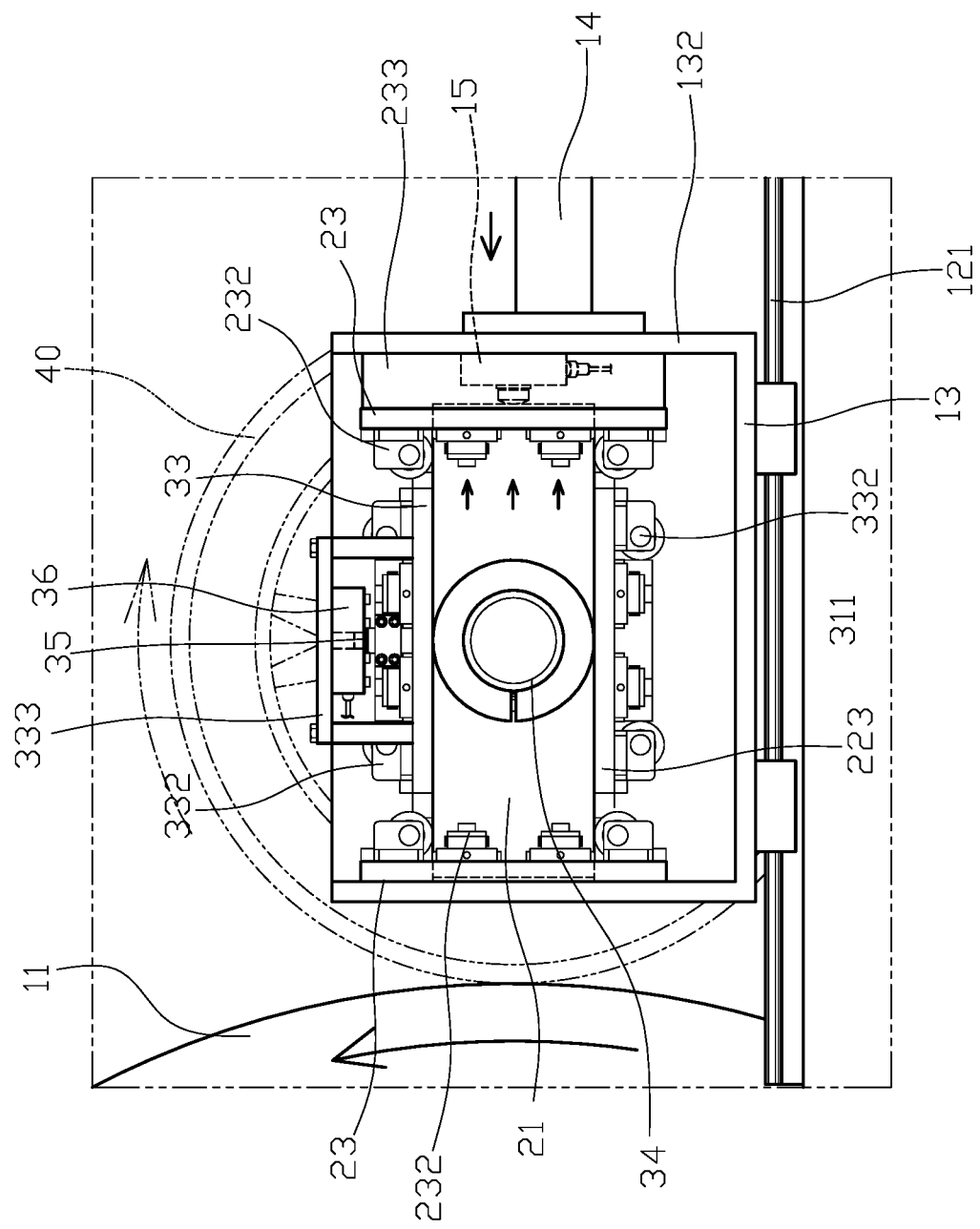
FIG. 8 is a schematic view of the first connecting member floating against the X-axis sensing unit according to the preferred embodiment of the present invention.
Figure 9:
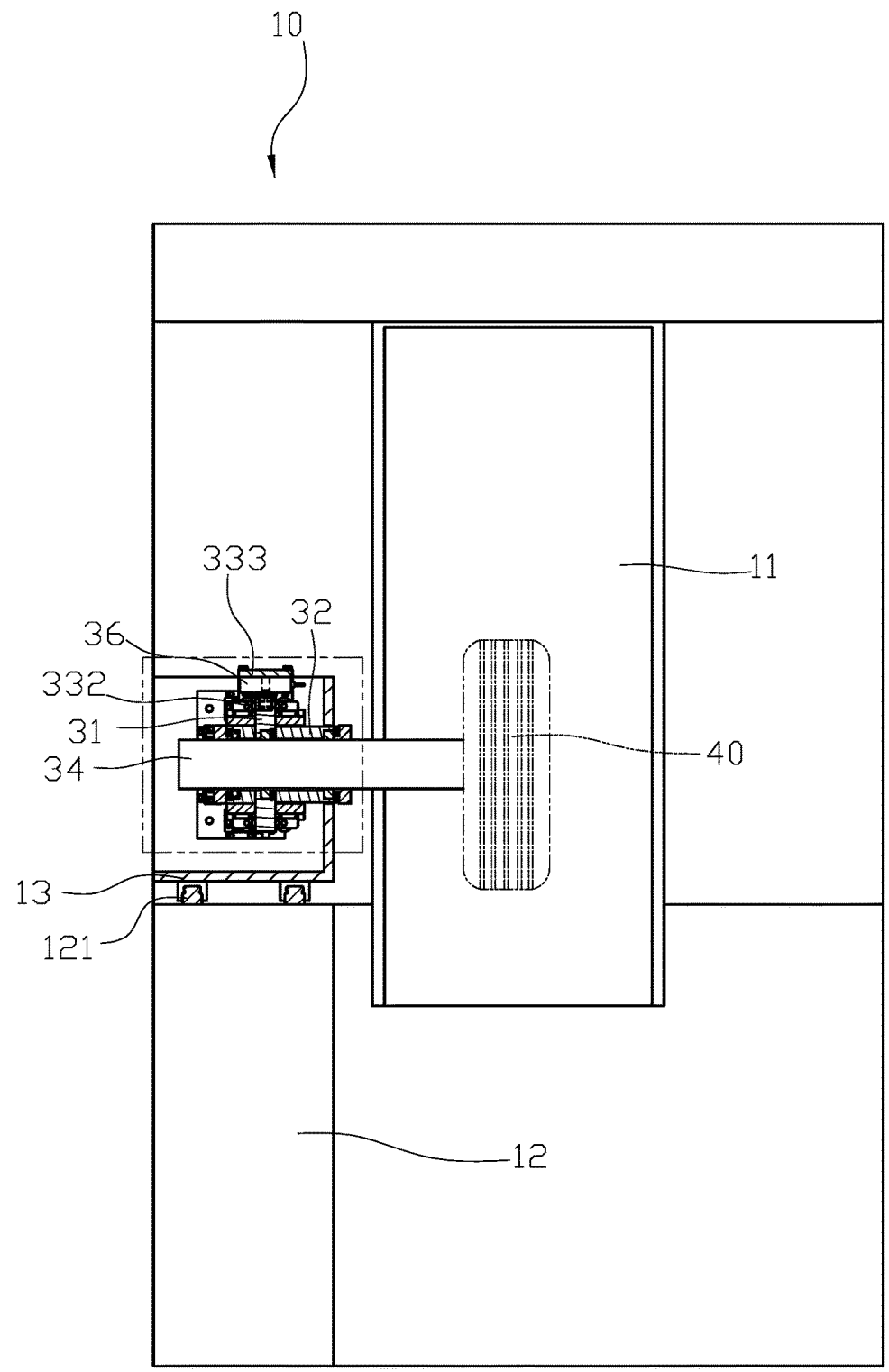
FIG. 9 is a cross-sectional view showing the test procedure according to the preferred embodiment of the present invention.
Figure 10:
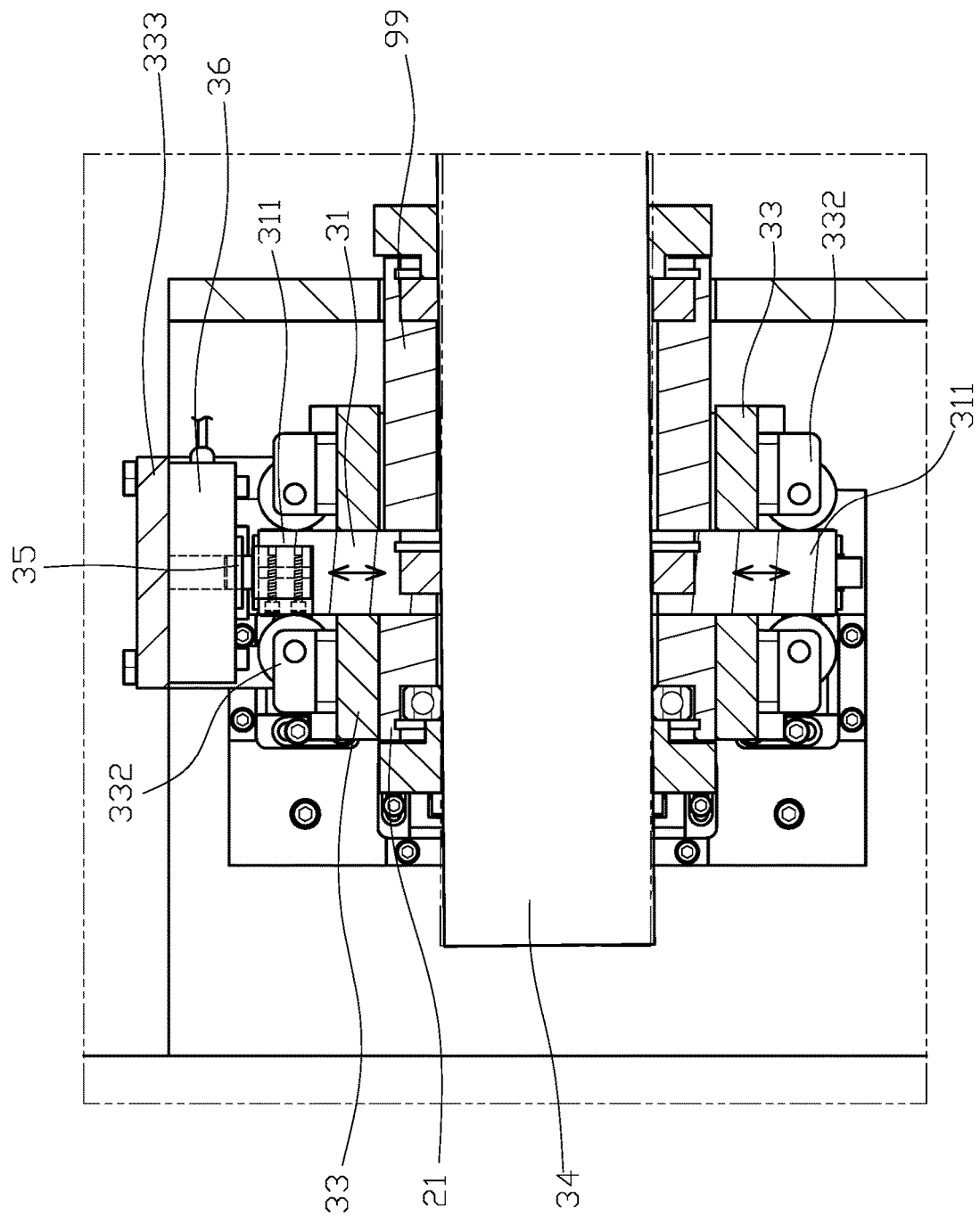
FIG. 10 is a schematic view of the second connecting member floating against the Y-axis sensing unit according to the preferred embodiment of the present invention.

For actual use of the structure, continued to refer to FIGS. 4, 5, and 6. When the main testing set 10 is applied for testing a tire 40, the tire 40 is set on the front end of the axial rod 34, and the tire 40 and the loading wheel 11 are aligned in the same straight line. The hydraulic cylinder 14 pushes the gliding member 13 along the tracks 121 toward the loading wheel 11, and a pressured is applied onto the tire 40 to make the tire 40 to make contact with the loading wheel 11. Then, the loading wheel 11 is rotated to drive the tire 40 to simulate the movement of the tire 40 on the road, in order to test the tread flatness, runout rate or load resistance in the X and Y axis directions for the tire 40. Since the first connecting member 21 of the X-axis sensing member 20 is floatingly disposed between the two X-axis positioning plates 23, and the second connecting member 31 of the Y-axis sensing member 30 is floatingly disposed between the two Y-axis positioning plates 33, when offsets or jumps occur during the rotation of the tire 40 or in order to sense the load in the X and Y axis directions of the tire, please refer to the FIGS. 7, 8, 9, and 10, the first connecting member 21 or the second connecting member 31 is touched by the axial rod 34 to generates a displacement. The X and Y-axis sensing members 20, 30 are respectively provided with an X-axis sensing unit 15 and the Y-axis sensing unit 36 for sensing the contact resistances of the first connecting member 21 and the second connecting member 31 and then obtaining the test data of the X-axis and the Y-axis, to achieve the purpose of determining the yield of the tire 40.

With the structure of the above specific embodiment, the following benefits can be obtained: Since the X-axis sensing member 20 and the Y-axis sensing member 30 are configured for testing the tire 40, wherein the first connecting member 21 and the second connecting member 31 are floatingly mounted between the two X-axis positioning plates 23 and the two Y-axis positioning plates 33 which allow the axial rod 34 to be placed through and perform the test. This design greatly improves the sensitivity of the first connecting member 21 and the second connecting member 31, and avoids the mutual interference between the X-axis moment and the Y-axis moment when the tire 40 is tested. Therefore, the precision of the test and the accuracy of rolling resistance data is improved.

Furthermore, the two X-axis positioning plates 23 and the two Y-axis positioning plates 33 are further provided with the rollers 232, 332 around the first and second sleeved apertures 231, 331. Since the first connecting member 21 and the second connecting member 31 float above the sleeved apertures 231, 331 which not only avoids frictional resistance with the surface of the sleeved apertures 231, 331, but also adds stability and smoothness to the first connecting member 21 and the second connecting member 31 through the support of the roller 232, 332 and improves the accuracy of the test operation and the efficiency of the test.

Although the present invention has been explained in relation to its preferred embodiment, it is to be understood that many other possible modifications and variations can be made without departing from the spirit and scope of invention as hereinafter claimed.

What is claimed is:

1. A tire rolling resistance testing machine comprising:
   a main testing set having a loading wheel and a testing base, the testing base comprising two tracks and a gliding member, the gliding member having a first frame parallel to the loading wheel and two parallel second frames fixed at two ends of the first frame, the first frame having a through aperture and a hydraulic cylinder connected to the second frame;
   an X-axis sensing member having a first connecting member and two assembling plates, the first connecting member having an first axial sleeve, the two assembling plates disposed parallel and evenly from the axial sleeve, an X-axis positioning plate disposed on each side of the first connecting member; each X-axis positioning plate having a first sleeved aperture jacketed onto respective ends of the first connecting member; the two X-axis positioning plates having a plurality of rollers around the first sleeved aperture, the roller making contact with the first connecting member; the two X-axis positioning plates disposed on the two second frames of the gliding member, one of the X-axis positioning plates having two joining plates attached to one of the second frames; the second frame having an X-axis sensing unit disposed between the two joining plates;
   a Y-axis sensing member having a second connecting member and a second axial sleeve, both ends of the second connecting member provided with a conjoint section jacketed with a second sleeved aperture of a Y-axis positioning plate, and each of the two Y-axis positioning plates having a plurality of rollers around the second sleeved aperture; the roller making contact with the conjoint section; the two Y-axis positioning plates disposed between the two assembling plates of the X-axis sensing member; the second axial sleeve aligned with the first axial sleeve of the first connecting member and accepting an axial rod; the conjoint section of the second connecting member provided with a reference member, and the Y-axis positioning plate having a roof with a Y-axis sensing unit coupled with the reference member.

2. The tire rolling resistance testing machine as claimed in claim 1, wherein the conjoint section of the second connecting member further comprises an assembling indention for accepting the reference member and being limited by an assembling block, and edges of the reference member are higher than edges of the conjoint section.

3. The tire rolling resistance testing machine as claimed in claim 1, wherein the Y-axis sensing member is mounted in the gliding member with the X-axis sensing member, the axial sleeve passing through the through aperture of the first frame and accepting the axial rod.

4. The tire rolling resistance testing machine as claimed in claim 1, wherein the two X-axis positioning plates are disposed at two ends of the first connecting member, and the edge of the first connecting member is even with an edge of the two X-axis positioning plates.

* * * * *